US010711805B2

(12) United States Patent
Brunner et al.

(10) Patent No.: US 10,711,805 B2
(45) Date of Patent: Jul. 14, 2020

(54) DEVICES, SYSTEMS, AND METHODS FOR VARIABLE FLOW RATE FUEL EJECTION

(71) Applicants: Douglas A. Brunner, Bear, DE (US); Manish Bajpai, Newark, DE (US); John Adam C. Kinzey, Wilmington, DE (US); Shane Marcks, Chester Springs, PA (US); Ajay Prasad, Newark, DE (US); Suresh Advani, Newark, DE (US)

(72) Inventors: Douglas A. Brunner, Bear, DE (US); Manish Bajpai, Newark, DE (US); John Adam C. Kinzey, Wilmington, DE (US); Shane Marcks, Chester Springs, PA (US); Ajay Prasad, Newark, DE (US); Suresh Advani, Newark, DE (US)

(73) Assignee: University Of Delaware, Newark, DE (US)

(*) Notice: Subject to any disclaimer, the term of this patent is extended or adjusted under 35 U.S.C. 154(b) by 277 days.

(21) Appl. No.: 15/565,720

(22) PCT Filed: Apr. 15, 2016

(86) PCT No.: PCT/US2016/027679
§ 371 (c)(1),
(2) Date: Oct. 11, 2017

(87) PCT Pub. No.: WO2016/168545
PCT Pub. Date: Oct. 20, 2016

(65) Prior Publication Data
US 2018/0073523 A1  Mar. 15, 2018

Related U.S. Application Data

(60) Provisional application No. 62/147,863, filed on Apr. 15, 2015.

(51) Int. Cl.
*F04F 5/46* (2006.01)
*F04F 5/52* (2006.01)
(Continued)

(52) U.S. Cl.
CPC ............. *F04F 5/461* (2013.01); *F04F 5/20* (2013.01); *F04F 5/465* (2013.01); *F04F 5/52* (2013.01);
(Continued)

(58) Field of Classification Search
CPC ...... F04F 5/46; F04F 5/461; F04F 5/465; F04F 5/52; H01M 8/04097; G05D 7/0617; G05D 7/0676
(Continued)

(56) References Cited

U.S. PATENT DOCUMENTS 4,940,207 A *  7/1990  Katsuyama ........... F16K 31/086
                                                 251/63.5
5,331,995 A     7/1994  Westfall et al.
(Continued)

OTHER PUBLICATIONS

International Preliminary Report on Patentability for International Application No. PCT/US2016/027679, dated Oct. 17, 2017, 8 Pages.
(Continued)

*Primary Examiner* — Philip E Stimpert
(74) *Attorney, Agent, or Firm* — RatnerPrestia

(57) ABSTRACT

Variable flow rate fuel ejectors, and methods of use therefore, are disclosed. One variable flow rate ejector includes a primary nozzle, a needle, a motor, a first stop portion, and a first impact-absorbing portion. The primary nozzle is connected to a first inlet chamber to receive a first fluid and transmit a flow of the first fluid through the primary nozzle opening. The needle is disposed to create a gap between the tapered portion of the needle and the primary nozzle open-
(Continued)

ing. The motor is coupled to axially move the needle to vary a size of the gap. The first stop portion delimits the axial movement of the needle in a direction of retraction of the needle from the primary nozzle opening. The first impact-absorbing element is positioned to contact the first stop portion or the needle, respectively, when the needle is fully retracted from the primary nozzle opening.

28 Claims, 7 Drawing Sheets

(51) Int. Cl.
*F04F 5/20* (2006.01)
*H01M 8/04089* (2016.01)
*G05D 7/06* (2006.01)

(52) U.S. Cl.
CPC ...... *G05D 7/0617* (2013.01); *H01M 8/04089* (2013.01); *H01M 8/04097* (2013.01)

(58) Field of Classification Search
USPC .......................................... 417/151, 182, 183
See application file for complete search history.

(56) References Cited

U.S. PATENT DOCUMENTS

| 6,858,340 | B2 | 2/2005 | Sugawara et al. |
| 2006/0283984 | A1 | 12/2006 | Enke |
| 2008/0118371 | A1 | 5/2008 | Vasquez et al. |
| 2009/0121167 | A1 | 5/2009 | O'Brien |
| 2009/0266915 | A1* | 10/2009 | Fedorov ................ B05B 7/064 |
| | | | 239/303 |
| 2009/0317691 | A1 | 12/2009 | Yamada et al. |
| 2014/0080016 | A1* | 3/2014 | Brunner ................ F04F 5/466 |
| | | | 429/414 |

OTHER PUBLICATIONS

International Search Report and Written Opinion for International Application No. PCT/US2016/027679, dated Jul. 8, 2016, 8 Pages.

* cited by examiner

DEVICES, SYSTEMS, AND METHODS FOR VARIABLE FLOW RATE FUEL EJECTION

CROSS REFERENCE TO RELATED APPLICATIONS

This application is a U.S. National Phase Application of PCT International Application PCT/US2016/027679, filed Apr. 15, 2016, which claims the benefit of U.S. Provisional Application No. 62/147,863, filed Apr. 15, 2015, the contents of which are incorporated herein in their entireties for all purposes.

FIELD OF THE INVENTION

The present invention relates generally to fuel ejection, and more particularly, to devices, systems, and methods for variable flow rate fuel ejection.

BACKGROUND OF THE INVENTION

Hydrogen fuel cells generally do not consume all the hydrogen or oxygen supplied to them, as this would allow liquid water and inert gases to accumulate in the areas of the cell that are close to the end of the gas channel, resulting in severe performance loss due to low reactant concentration. Instead, such fuel cells are generally provided with some excess gas. In small systems or research fuel cells, the excess gas may simply be vented for the purposes of simplicity. In a large system (e.g. like that used to power a vehicle), however, the requirements of fuel efficiency necessitate that the excess hydrogen gas be recirculated for later use.

Positive displacement mechanical pumps have generally been used for recirculating hydrogen in a fuel cell system; they are usually of the vane or Roots® blower type. Whatever their mechanical details, they all use some solid moving part to push the hydrogen through the system. The design and operation of such mechanical pumps or blowers, however, is a serious engineering challenge, because the moist hydrogen in fuel cell systems corrodes many common materials (impervious materials are generally limited and/or costly), and the moving parts cannot be lubricated with any oil or grease that might contaminate the fuel cell stack. In addition, such devices require substantial energy to operate, and thus increase the balance-of-plant load, decreasing the overall efficiency of the fuel cell system.

One alternative to the above design includes the use of mechanical diaphragms. Systems that require less pressure differential from fuel cell inlet to outlet, and consequently lower hydrogen supply pressure, may use a dual mechanical diaphragm. Such a system is disclosed in U.S. Pat. No. 6,858,340. The pressure differential between hydrogen and air in the arrangement described in the above-referenced patent, however, generally depends on hydrogen supply pressure and decreases with increasing absolute air pressure.

Another alternative includes the use of fixed geometry ejectors. U.S. Patent Application Publication No. 2008/0118371 refers to an ejector that has many similarities to manually adjustable steam ejectors well-known in engineering practice since at least the early 20th century. The ejector described in the above-described application, however, may only perform adequately or optimally at a specific gas flow rate or within a relatively small range of flow rates. Accordingly, improvements in systems and devices for recirculating hydrogen in fuel cells are desired.

SUMMARY OF THE INVENTION

The present invention is directed to variable flow rate fuel ejectors and methods of use therefore.

In accordance with one aspect of the present invention, a variable flow rate ejector includes a primary nozzle, a needle, a motor, a first stop portion, and a first impact-absorbing portion. The primary nozzle defines an opening. The primary nozzle is connected to a first inlet chamber to receive a first fluid and transmit a flow of the first fluid through the primary nozzle opening. The needle is disposed within the primary nozzle opening and has a tapered portion. The needle is sized to create a gap between the tapered portion of the needle and the primary nozzle opening. The motor is coupled to axially move the needle in order to vary a size of the gap between the tapered portion of the needle and the primary nozzle opening. The first stop portion delimits the axial movement of the needle by the motor in a direction of retraction of the needle from the primary nozzle opening. The first impact-absorbing element is coupled to the needle or to the stop portion. The first impact-absorbing element is positioned to contact the first stop portion or the needle, respectively, when the needle is fully retracted from the primary nozzle opening by the motor.

In accordance with another aspect of the present invention, a method for recirculating hydrogen gas inside a fuel cell system including the above variable flow rate ejector is disclosed. The method includes supplying a first quantity of hydrogen gas to the first inlet chamber at a first pressure, supplying a second quantity of hydrogen gas to the second inlet chamber at a second pressure lower than the first pressure, and controlling the flow of the hydrogen gases from the ejector by axially moving the needle using the motor.

In accordance with yet another aspect of the present invention, a method for operating a variable flow rate ejector is disclosed. The ejector includes a primary nozzle defining an opening, a needle disposed within the primary nozzle opening, and a stepper motor coupled to axially move the needle. The method includes assigning a first position of the needle to be an origin position of the needle with an ejector control unit, measuring an output pressure of the ejector, the output pressure comprising a pressure of fluid flowing past the needle through the primary nozzle opening, comparing the output pressure to a predetermined pressure, when the output pressure exceeds the predetermined pressure, controlling the motor with the ejector control unit to axially move the needle one or more steps in an insertion direction of the needle relative to the primary nozzle opening until the needle reaches a fully inserted position, assigning the fully inserted position of the needle to be the origin position of the needle with the ejector control unit, and controlling the motor with the ejector control unit to axially move the needle a number of steps relative to the origin position.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

The various aspects of the present invention relate generally to devices, systems, and methods for various flow rate ejectors. Embodiments of the invention include a device adapted to be inserted into a fluid circulation system and control the flow rate of the fluid in the circulation system.

The devices, systems, and methods described herein are particularly suitable for use in recirculation of hydrogen gas in hydrogen fuel cells. The disclosed systems may be particularly suited for maintaining an optimal flow rate and pressure between the gas outlet and the gas inlet of a fuel cell. Additional details regarding the control of flow rate will be described in greater detail herein.

While the invention is described herein primarily with respect to hydrogen gas recirculation, it will be understood that the invention is not so limited. The disclosed embodiments may be usable for variable flow rate control of fluids in any suitable system.

As set forth above, aspects of the invention relate generally to a novel variable flow rate ejector. The ejector is configured to take high pressure fluid from a first feed and create a supersonic jet of the high pressure fluid that entrains and accelerates a separate low pressure fluid from a second feed. The ejector may then slow down the mixed fluid in a diffuser, and discharge the mixed fluid at a pressure higher than the low pressure fluid. The ejector may be particularly well-suited for use in feeding high-pressure hydrogen from storage tanks supplying a fuel cell system to entrain and recirculate low-pressure hydrogen returning from the fuel cell stack. The ejector is controlled to maintain the desired pressure in the system using a movable needle in the ejector.

Figure 1A:
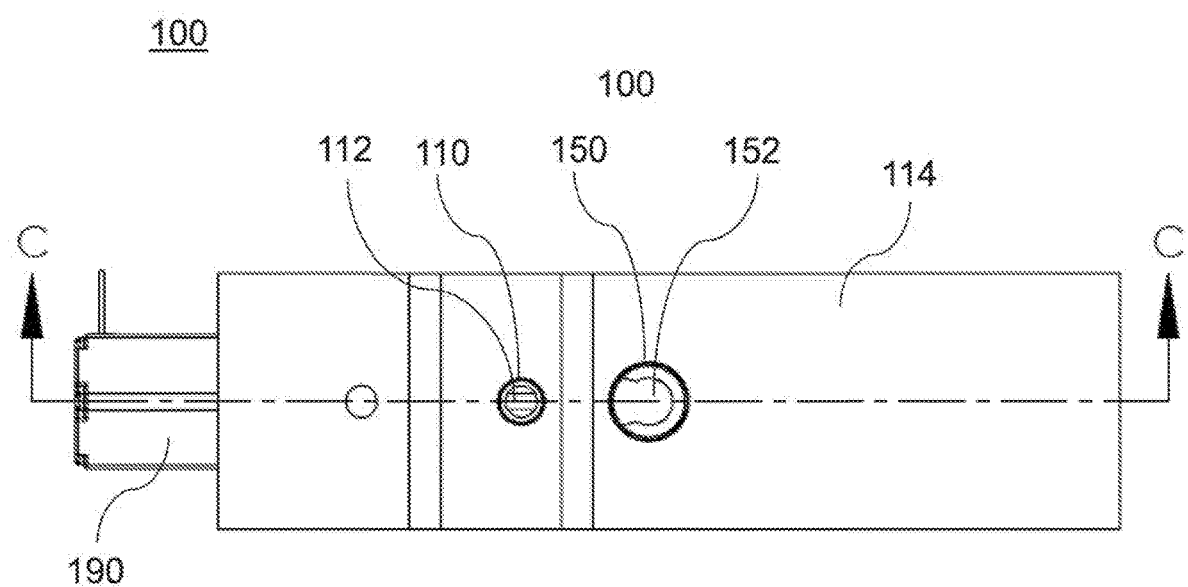
FIG. 1A is a diagram illustrating a top view of an exemplary variable flow rate ejector in accordance with aspects of the present invention.
Figure 1B:
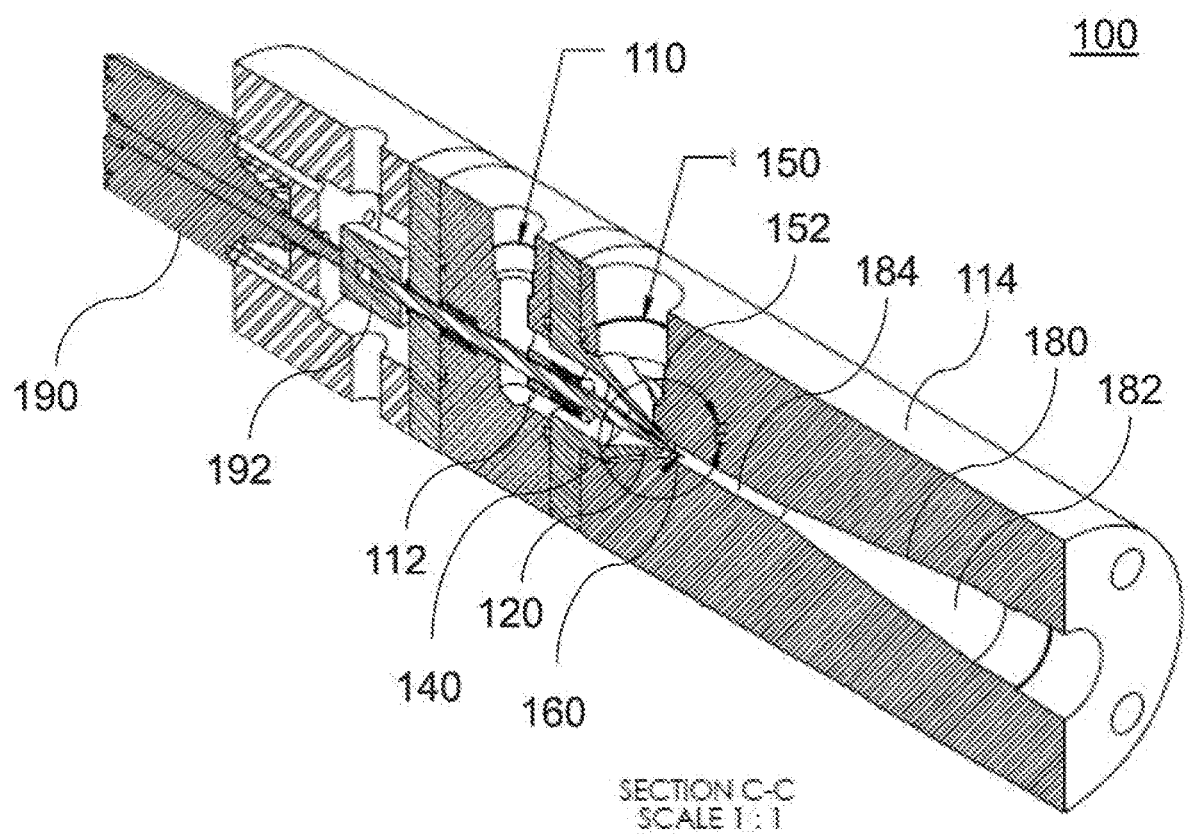
FIGS. 1B and 1C are diagrams illustrating cross-sectional views of the variable flow rate ejector of FIG. 1A.
Figure 1C:
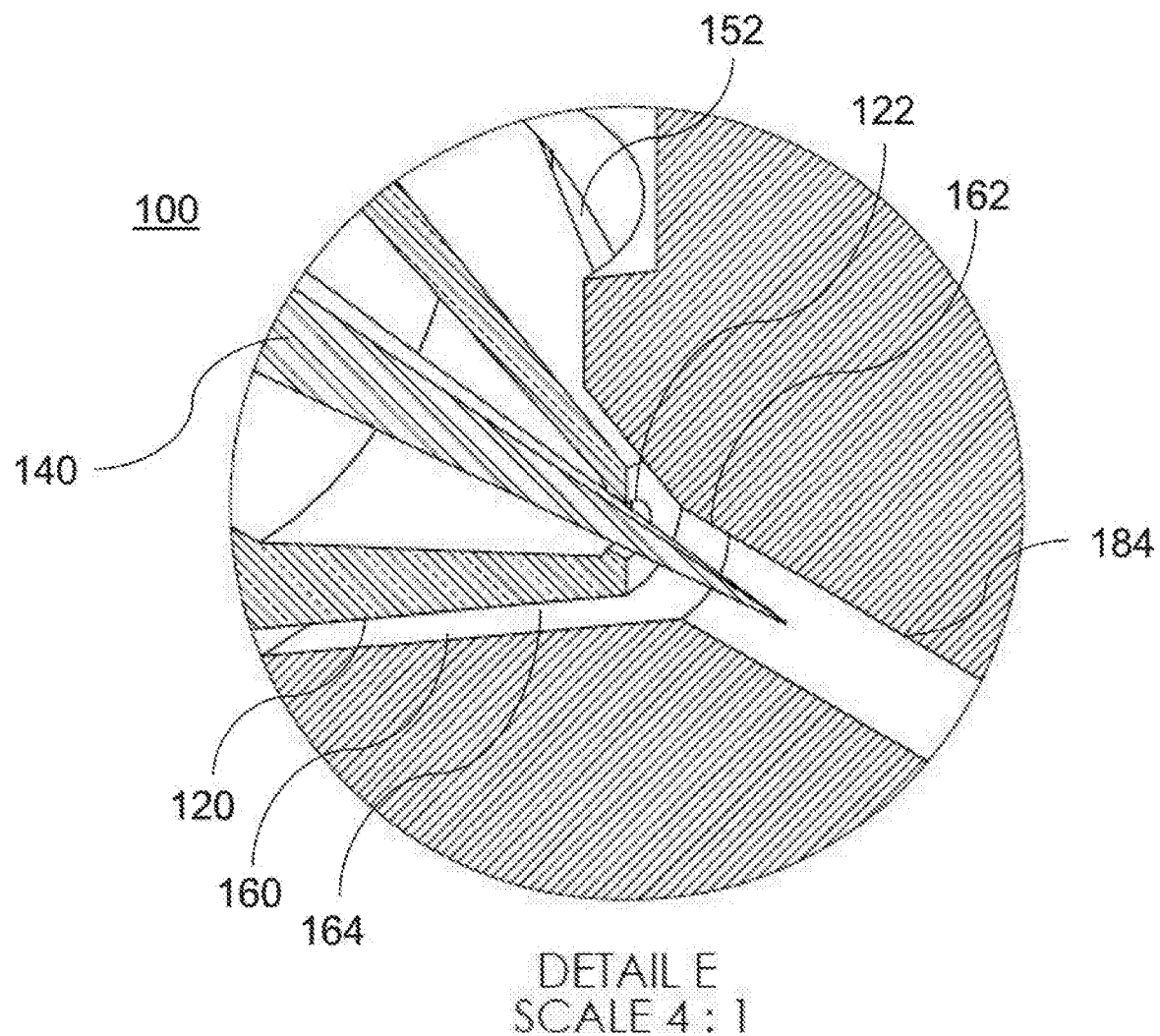

Referring now to the drawings, FIGS. 1A-1C illustrate an exemplary variable flow rate ejector 100 in accordance with aspects of the present invention. Ejector 100 may be particularly suitable for use in recirculation of hydrogen gas in hydrogen fuel cells. As a general overview, ejector 100 includes a primary inlet 110, a primary nozzle 120, a needle 140, a secondary inlet 150, and a secondary nozzle 160. Additional details of ejector 100 are described herein.

Primary inlet 110 is configured to be connected to a first fluid source at a first pressure. Primary inlet 110 opens into a first inlet chamber 112 formed in ejector 100. In an exemplary embodiment, ejector 100 has a cylindrical ejector body 114, as shown in FIGS. 1A and 1B. Ejector body 114 may comprise one or more distinct pieces. Primary inlet 110 is defined in a sidewall of ejector body 114, and first inlet chamber 112 is formed within ejector body 114. The first fluid source may be maintained at a high pressure, such that the first fluid is forced through primary inlet 110 and into first inlet chamber 112. Exemplary materials for forming ejector body 114 include but are not limited to anodized aluminum, acetal, and nickel. Other suitable materials will be known to one of ordinary skill in the art from the description herein.

Primary nozzle 120 is connected to first inlet chamber 112. Primary nozzle 120 defines a primary nozzle opening 122 for restricting the flow of the first fluid through primary nozzle 120. In an exemplary embodiment, primary nozzle 120 is positioned within ejector body 114, as shown in FIGS. 1B and 1C. Primary nozzle 120 may be a separately formed component from ejector body 114, as shown in FIG. 1B, or may be integrally formed into a single piece with ejector body 114. Primary nozzle 120 is connected to receive the first fluid from first inlet chamber 112 and transmit a flow of the first fluid through primary nozzle opening 122. Primary nozzle 122 may be formed from any of the materials described above with respect to ejector body 114.

Needle 140 is disposed within primary nozzle opening 122. Needle 140 is axially movable within primary nozzle opening 122 in order to vary an area of primary nozzle opening 122. In an exemplary embodiment, needle 140 has a conical shape, as shown in FIGS. 1B and 1C. The conical portion changes in cross-sectional area along its axial length. Thus, axial movement of needle 140 changes the cross-sectional area of needle 140 that is positioned in primary nozzle opening 122 at any one time. The area through which the first fluid can flow in primary nozzle opening 122 is dependent on the space between the inner wall of primary nozzle opening 122 and the surface of needle 140. As outlined above, this area may be adjusted by repositioning needle 140. Accordingly, the movement of needle 140 may be controlled to vary the flow rate of the first fluid through primary nozzle opening 122.

The shape of needle 140 is also selected to improve the smoothness of the flow of the first fluid. Regardless of the area of primary nozzle opening 122, the supersonic flow of the first fluid remains attached to needle 140 and then separates cleanly from the pointed end, with minimal turbulence. It may be desirable that needle 140 extend all the way into the opening of secondary nozzle 160 when it is fully extended, as shown in FIG. 1C, in order to further promote smooth flow of the first fluid.

Primary nozzle opening 122 and needle 140 are sized to make the flow of the flat fluid through primary nozzle opening 122 have a supersonic speed when the first fluid source is connected to primary inlet 110 at the first pressure. In other words, as mentioned above primary inlet 110 is configured to be connected to a first fluid source at a predetermined first pressure (or range of pressures). The pressure on the first fluid controls the speed at which the first fluid flows through primary nozzle opening 122. Accordingly, in accordance with aspects of the present invention, the size of primary nozzle opening 122 and needle 140 may be selected based on the first pressure, in order to cause the first fluid to travel at supersonic speeds through primary nozzle opening 122. The supersonic speeds may reach or exceed Mach 2. Algorithms for determining an appropriate size for primary nozzle opening 122 and needle 140 based on the first pressure will be understood to one of ordinary skill in the art from the description herein.

Secondary inlet 150 is configured to be connected to a second fluid source at a second pressure. The second pressure is lower than the first pressure. Secondary inlet 150 opens into a second inlet chamber 152 formed in ejector 100. Second inlet chamber 152 is disposed outside of (and downstream of) primary nozzle opening 122. In an exemplary embodiment, second inlet chamber 152 is formed within ejector body 114, as shown in FIGS. 1B and 1C. The second fluid source may be maintained at a low pressure relative to the first fluid source. The flow of the first fluid through primary nozzle opening 122 draws second fluid through secondary inlet 150. In particular, the supersonic flow of the first fluid creates a static pressure at needle 140 lower than the second gas pressure. Accordingly, when the second fluid source is connected to secondary inlet 150 at the second pressure, at least a portion of the second fluid is entrained in the flow of the first fluid from primary nozzle 120, thereby creating a flow that includes both the first and second fluids.

Secondary nozzle 160 is connected to second inlet chamber 152. Primary nozzle 120 defines a secondary nozzle opening 162 downstream of primary nozzle opening 122. In an exemplary embodiment, secondary nozzle 160 is positioned within ejector body 114, as shown in FIGS. 1B and 1C. Secondary nozzle 160 may be a separately formed component from ejector body 114, or may be integrally formed into a single piece with ejector body 114, as shown in FIG. 1C. Secondary nozzle 160 is connected to receive the flow of first and second fluids from second inlet chamber 152 and transmit the flow of first and second fluids through secondary nozzle opening 162. As shown in FIG. 1C, secondary nozzle 160 has a converging section 164 extending from the outlet of primary nozzle opening 122 to secondary nozzle opening 162. In an exemplary embodiment, converging section 164 has a conical shape, with an angle between the side of the cone and the centerline of approximately 30 degrees.

Secondary nozzle opening 162 is sized to make the flow of the first and second fluids through secondary nozzle opening 162 have a subsonic speed. In other words, as mentioned above, the flow of first fluid through primary nozzle opening 122 has a supersonic speed, which is determined based on the size of primary nozzle 122 and needle 140. The second fluid in second inlet chamber 152 is entrained in this flow to create a flow of first and second fluids. Accordingly, the size of secondary nozzle opening 162 may be selected based on the size of primary nozzle 122 and needle 140, and the second pressure, in order to cause the first and second fluids to travel at subsonic speeds through secondary nozzle opening 162.

The distance between secondary nozzle opening 162 and primary nozzle opening 122 may be kept small in order to limit the production of eddies or turbulence in the flow of first fluid between the primary nozzle opening 122 and the secondary nozzle opening 162. In an exemplary embodiment, the distance from the outermost (i.e. downstream) edge of primary nozzle opening 122 to an innermost (i.e., upstream) edge of secondary nozzle opening 162 is less than the diameter of secondary nozzle opening 162.

As set forth above, the subsonic speed of the flow of first and second fluids may be controlled based on the size of the secondary nozzle opening 162 relative to the primary nozzle opening 122. In an exemplary embodiment, the secondary nozzle opening has a diameter from one to five times a diameter of the primary nozzle opening, in order to achieve a flow of first and second fluids at a subsonic speed.

The subsonic speed may be selected to be very close to the speed of sound, Mach 1, at the highest designed rate of flow of ejector 100. This may be desirable in order to limit the production of eddies or turbulence in the flow of first and second fluids through secondary nozzle opening 162. In an exemplary embodiment, the subsonic speed of the flow of first and second fluids is approximately 90% of Mach 1 when operating at maximum flow.

Ejector 100 is not limited to the above components, but may include alternative or additional components, as would be understood by one of ordinary skill in the art.

Ejector 100 may include a diffuser 180 positioned downstream of secondary nozzle opening 162. Diffuser 180 is configured to discharge the flow of first and second fluids from ejector 100. Diffuser 180 is configured to discharge this flow at a pressure greater than the second pressure (i.e., the pressure of the low pressure fluid). In an exemplary embodiment, diffuser 180 comprises a tapered outer wall 182, as shown in FIG. 1B. Tapered outer wall 182 widens in the direction of flow of the first and second fluids. Accordingly, wall 182 slows the speed of the flow, and lowers the pressure of the first and second fluids.

Where ejector 100 includes diffuser 180, ejector 100 may further include a throat portion 184 extending between secondary nozzle opening 162 and diffuser 180. Throat portion 184 has a constant width along the entire distance between secondary nozzle opening 162 and diffuser 180. In an exemplary embodiment, throat portion 184 comprises an extension of secondary nozzle 160, as shown in FIGS. 1B and 1C.

Throat portion 184 has substantially the same diameter as second nozzle opening 162. Further, as shown in FIG. 1B, throat portion 184 has a length much greater than its diameter. This may be preferable in order to maintain the speed of the flow of first and second fluids, and to limit flow separation or backflow. In an exemplary embodiment, throat portion 184 has a length of at least six times the diameter of throat portion 184.

Ejector 100 may further include means for axially moving needle 140. In an exemplary embodiment, the means comprise an electric stepper motor 190, as shown in FIGS. 1A and 1B. Stepper motor 190 is connected to an anvil 192 for moving needle 140 in an axial direction within primary nozzle opening 122. As explained above, because needle 140 partially obstructs primary nozzle opening 122, moving it back and forth with stepper motor 190 may create any desired open nozzle area for controlling the flow rate of the first fluid.

Exemplary measurements for the components of ejector 100 are set forth below. It will be understood by one of ordinary skill in the art that the measurements are set forth merely for the purposes of illustrating one embodiment of ejector 100, and are not intended to be limiting. This embodiment relates to an ejector designed to receive hydrogen gas through the primary inlet 110 at a rate of up to approximately 0.171 mole/second, and to discharge hydrogen gas at a pressure of between approximately 15-18 psig. Primary nozzle opening 122 has a diameter of 0.0625", and needle 140 has a cone half-angle of 5 degrees. When assembled, the gap between the exterior of primary nozzle 120 and the converging section 164 of secondary nozzle 160 is 0.0274". Throat portion 184 of ejector 100 has a diameter of 0.125" and a length of 0.9375". Diffuser 180 has a cone half-angle of 7.5 degrees, with an exit diameter of 0.5625".

Figure 2:
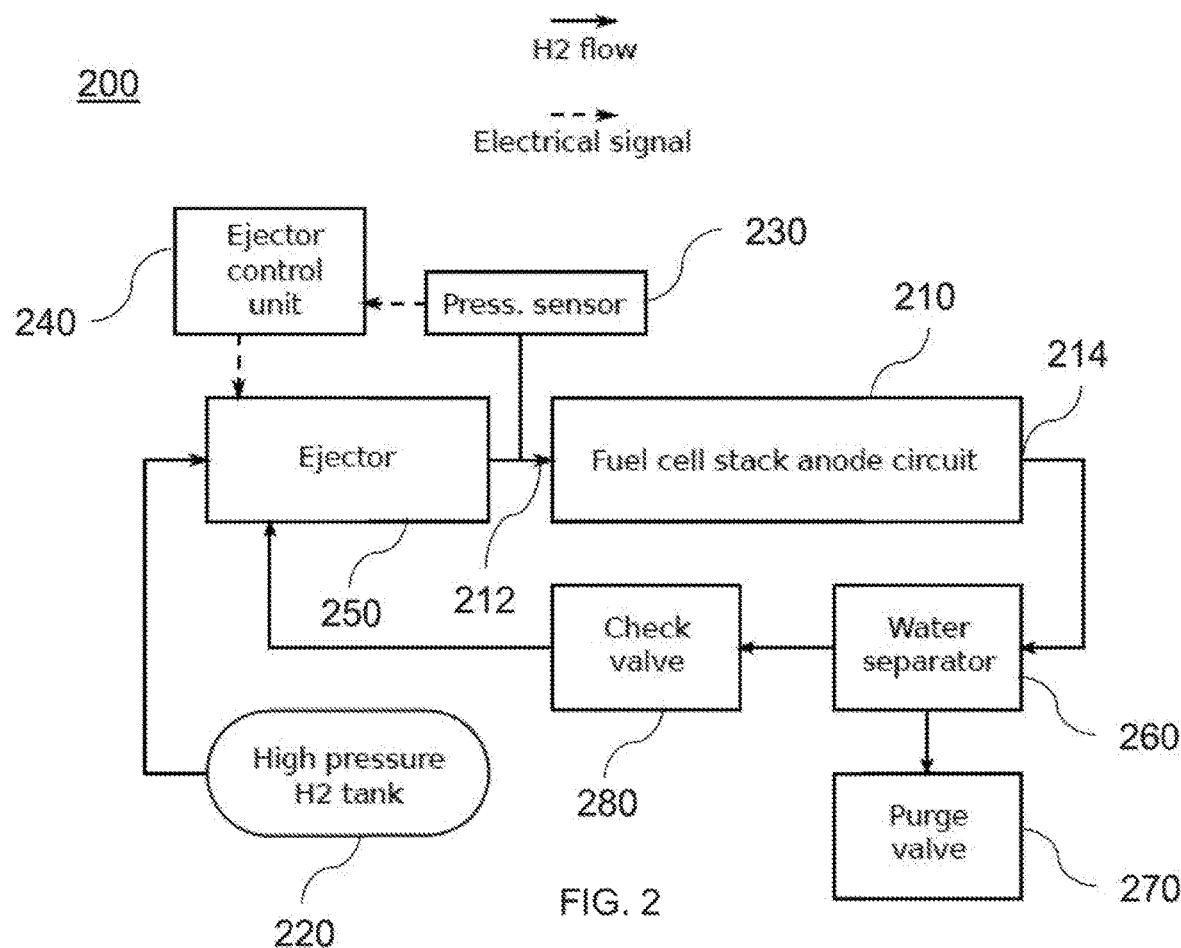
FIG. 2 is a block diagram illustrating an exemplary closed-loop fuel cell system in accordance with aspects of the present invention.

FIG. 2 illustrates an exemplary closed-loop fuel cell system 200 in accordance with aspects of the present invention. As a general overview, system 200 includes a fuel cell 210, and an ejector 250. Additional details of system 200 are described herein.

Fuel cell 210 produces energy through consumption of hydrogen gas. Fuel cell 210 comprises an anode circuit for producing the hydrogen gas for consumption by fuel cell 210. The anode circuit may produce hydrogen gas through a conventional electrolyzing process, as would be understood by one of ordinary skill in the art. Suitable fuel cells for use as fuel cell 210 will be known to one of ordinary skill in the art from the description herein.

Fuel cell 210 further includes a gas inlet 212 and a gas outlet 214, as shown in FIG. 2. As set forth above, it may be desirable to recirculate excess hydrogen gas produced by the anode circuit to ensure that fuel cell 210 operates properly, and to improve fuel efficiency of fuel cell 210. Accordingly, gas inlet 212 and gas outlet 214 form part of a hydrogen gas recirculation loop in system 200. As is explained below, ejector 250 is used to circulate the hydrogen gas within the hydrogen gas recirculation loop.

Ejector 250 is connected to fuel cell 210. In an exemplary embodiment, ejector 250 is a variable flow rate ejector substantially as described above with respect to ejector 100. In this embodiment, the inlets and outlet of ejector 100 may be connected to components of system 200 as described below.

Primary inlet 110 of ejector 100 is connected to a hydrogen storage system 220. Hydrogen storage system 220 corresponds to the first fluid source described above. Hydrogen storage system 220 stores hydrogen gas for consumption by fuel cell 210. Hydrogen storage system 220 is configured to provide high pressure hydrogen gas 220 through the primary inlet 110 of ejector 100.

Secondary inlet 150 of ejector 100 is connected to gas outlet 214 of fuel cell 210. As excess hydrogen gas is produced in fuel cell 210, the excess gas may flow out of the anode circuit through gas outlet 214 at a low pressure. Thus, the fuel cell 210 corresponds to the second fluid source described above. The low pressure hydrogen gas flows into ejector 100 through secondary inlet 150, where it is entrained in the supersonic flow of hydrogen gas from primary nozzle 120. The hydrogen gas from storage system 220 (i.e. the first fluid) and the hydrogen gas from fuel cell 210 (i.e. the second fluid) then flow through secondary nozzle 160, and are discharged from ejector 100.

The secondary nozzle 160 of ejector 100 is connected to discharge the flow of mixed hydrogen gases to gas inlet 212 of fuel cell 210. Where ejector 100 includes diffuser 180, the flow of mixed hydrogen gas is discharged from diffuser 180 to gas inlet 212 of fuel cell 210. Fuel cell 210 may then consume this flow of hydrogen gas from ejector 100 to produce energy.

System 200 is not limited to the above components, but may include alternative or additional components, as would be understood by one of ordinary skill in the art.

System 200 may include a pressure sensor 230 disposed between ejector 250 and gas inlet 212 of fuel cell 210, as shown in FIG. 2. Pressure sensor 230 is operable to sense a pressure of the flow of hydrogen gases from ejector 250 to gas inlet 212. This sensed pressure may be used to vary the flow rate from ejector 250 to match a rate at which fuel cell 210 consumes hydrogen (i.e. a reaction rate of fuel cell 210). Suitable pressure sensors for use as pressure sensor 230 include, for example, the US331-000005-030PG pressure sensor provided by Measurement Specialties of Hampton, Va.

System 200 may further include an ejector control unit 240 in communication with pressure sensor 230 and ejector 250, as shown in FIG. 2. Ejector control unit 240 is configured to axially move the ejector needle to vary the flow rate from ejector 250. In an exemplary embodiment, ejector control unit 240 is programmed to control a motor within ejector 250 to move the ejector needle. Ejector control unit 240 operates the motor in such a way so as to maintain the flow of hydrogen gases from ejector 250 to gas inlet 212 at a predetermined pressure. The predetermined pressure may be selected based on the requirements of fuel cell 210. A suitable processor for use as ejector control unit 240 is a PIC18F1220 microcontroller provided by Microchip Technology Inc. of Chandler, Ariz. Other suitable processors will be known to one of ordinary skill in the art from the description herein.

System 200 may further include a separator 260, a purge valve 270, and a check valve 280. Separator 260 is disposed between gas outlet 214 of fuel cell 210 and ejector 250, as shown in FIG. 2. Separator 260 is configured to separate water from the low pressure hydrogen gas the flows out from fuel cell 210. Purge valve 270 is connected to separator 260, as shown in FIG. 2. Purge valve 270 is configured to remove the separated water from system 200, i.e., to remove the water from the hydrogen gas recirculation loop. The water may then be vented or reused in the anode circuit of fuel cell 210. Check valve 280 is connected downstream of separator 260, and is operable to prevent any backflow of hydrogen gas from ejector 250 toward fuel cell 210. Suitable components for use as separator 260, purge valve 270, and check valve 280 will be known to one of ordinary skill in the art from the description herein.

Figure 3:
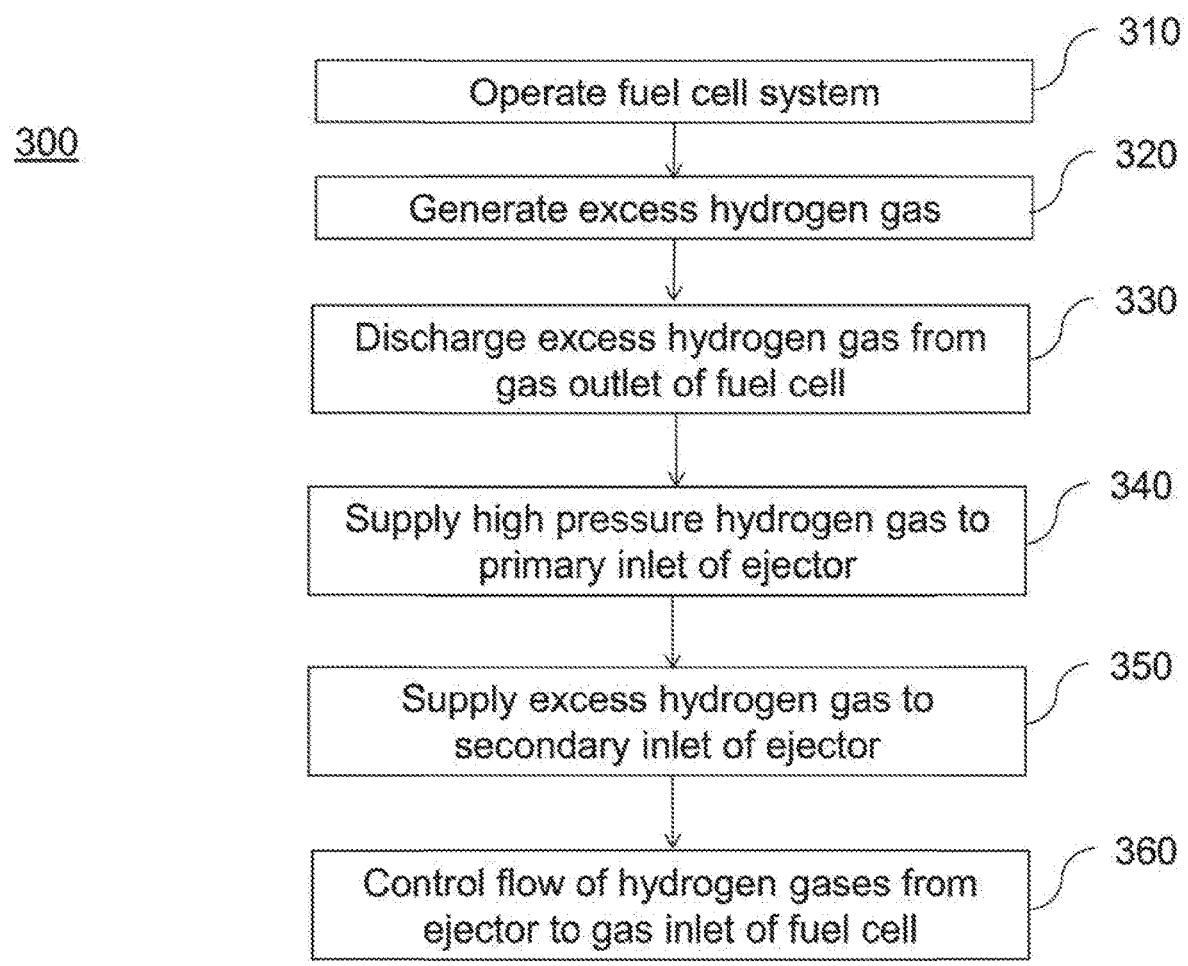
FIG. 3 is a flowchart illustrating an exemplary method for circulating hydrogen inside a fuel system in accordance with aspects of the present invention.

FIG. 3 is a flowchart illustrating an exemplary method 300 for recirculating hydrogen gas inside a fuel cell system in accordance with aspects of the present invention. As a general overview, method 300 includes operating a fuel cell, generating excess hydrogen gas, discharging the excess hydrogen gas, supplying high pressure hydrogen gas to an ejector, supplying the excess hydrogen gas to the ejector, and controlling the flow of hydrogen gas from the ejector. Additional details of method 300 are described herein with respect to the components of variable flow rate ejector 100 and closed loop fuel cell system 200.

During operation of a fuel cell (step 310), such as exemplary fuel cell system 200, the anode circuit of fuel cell 210 produces hydrogen gas for consumption by the fuel cell. Fuel cell 210 consumes the hydrogen gas to generate energy. The operation of fuel cell 210 will be understood by one of ordinary skill in the art from the description herein. In general, and in the exemplary embodiment discussed herein, the anode circuit generates a greater quantity of hydrogen gas than is required by the reaction rate of fuel cell 210, as illustrated in step 320. Hydrogen gas not consumed by the predetermined reaction rate of fuel cell 210 is referred to as "excess hydrogen gas" for the purpose of this description.

In step 330, the excess hydrogen gas generated by operating the fuel cell is discharged from the gas outlet of the fuel cell. In an exemplary embodiment, excess hydrogen gas is discharged from gas outlet 214 of fuel cell 210. The excess hydrogen gas flows outward through gas outlet 214 at a low pressure.

In step 340, a high pressure hydrogen gas is provided to an ejector. In an exemplary embodiment, hydrogen storage system 220 maintains a source of hydrogen gas at high pressure. In this embodiment, ejector 250 comprises an ejector substantially as described above with respect to ejector 100. Hydrogen storage system 220 supplies the high pressure hydrogen gas to the primary inlet 110 of ejector 100. The hydrogen gas then flows through primary nozzle 120 of ejector 100 at a supersonic speed, as described above with respect to ejector 100.

In step 350, the excess quantity of hydrogen gas is provided to the ejector. In an exemplary embodiment, the excess hydrogen gas from gas outlet 214 is supplied at low pressure to secondary inlet 150 of ejector 100. The low pressure hydrogen gas is then entrained in the supersonic flow of the high pressure hydrogen gas, to form a mixed flow of hydrogen gases. The flow of hydrogen gases then passes through secondary nozzle 160 of ejector 100.

In step 360, the flow of hydrogen gases from the ejector is controlled. In an exemplary embodiment, the flow of hydrogen gases from ejector 100 is controlled through the movement of needle 140. The flow is controlled to match the reaction rate of fuel cell 210.

Step 360 may be performed through the use of pressure sensor 230 and ejector control unit 240, as described above. In an exemplary embodiment, pressure sensor 230 senses a pressure of the flow of hydrogen gases from ejector 100 to the gas inlet 212 of fuel cell 210. Ejector control unit 240 controls the flow of hydrogen gases from ejector 100 by operating motor 190 to axially move needle 140, based on the sensed pressure from pressure sensor 230. In particular, ejector control unit 240 may control the flow of hydrogen gases to match the reaction rate of fuel cell 210.

It may be desirable that closed loop fuel cell system 200 have positive hydrogen gas pressure relative to the surrounding ambient air. This allows the hydrogen gas to leak out of the system, rather than allowing air to leak into the system. Fuel cell system 200 is constructed such that the only way for hydrogen to leave the system 200 (except by a periodically operated purge valve) is for it to react in fuel cell 210. Accordingly, the primary nozzle opening 122 is optimally controlled through movement of needle 140 so that the flow of hydrogen gas from ejector 100 matches the reaction rate of fuel cell 210. Otherwise, hydrogen may build up in or be depleted from the closed loop, causing a pressure differential that can damage fuel cell membranes.

Accordingly, ejector control unit 240 may be programmed to adjust the position of needle 140 based on the difference in pressure from the predetermined ideal pressure dictated by the fuel cell 210. Ejector control unit 240 may further include a control algorithm with an integral windup limiter, in order to reduce pressure overshoot following large step changes in pressure command or reaction rate, and a pressure error dead band, to reduce hunting caused by electrical noise and pressure sensor hysteresis.

Method 300 is not limited to the above steps, but may include alternative steps and additional steps, as would be understood by one of ordinary skill in the art from the description herein.

For one example, as described above, fuel cell system 200 may include separator 260 and purge valve 270. These components are particularly important when step 330 comprises discharging both the excess hydrogen gas and a portion of water mixed with the excess hydrogen gas. In this embodiment, method 300 may further include the steps of separating the water from the excess hydrogen gas with separator 260, and removing the separated water from system 200 with purge valve 270.

As set forth above, ejector 100 may include an electric stepper motor 190 configured to axially move needle 140, as shown in FIGS. 1A and 1B. Additional details regarding the operation of motor 190 and the interface between needle 140 and motor 190 are set forth below with respect to FIGS. 4 and 5.

In operation, motor 190 moves needle 140 in and out of primary nozzle opening 122 in response to commands from ejector control unit 240. In one embodiment, motor 190 comprises a servo motor in communication with an encoder to provide position feedback regarding the precise position of the needle 140 relative to primary nozzle opening 122.

In an alternative (and less costly) embodiment, motor 190 comprises a stepper motor, which is operated on the assumption that its rotor will turn at the same speed as the rotating magnetic field created by the motor drive. In this embodiment, stepper motor 190 may not be able to determine the absolute position of its axis (and thus the position of needle 140) on startup; rather, the position may be determined using either a switch actuated at some known point in the needle's travel (a limit switch) or by a controlled collision with a mechanical stop.

In ejector 100, however, the shallow taper of needle 140 implies that even small deviations in the diameter of the primary nozzle opening 122 (e.g., due to manufacturing tolerances, or wear during operation) can result in large deviations in the linear position of the needle 140 at which the primary nozzle opening 122 is fully occluded. Therefore, in embodiments including a limit switch, extremely precise tolerances may need to be maintained throughout manufacture of ejector 100, and the switch may need periodic recalibration as components experience wear through the service life of the ejector.

In a preferred embodiment, ejector 100 determines the absolute position of needle 140 using a controlled collision between needle 140 and either primary nozzle opening 122 or a stop portion (e.g. a wall or surface) coupled to the primary nozzle 120, after which the needle's position is taken as zero, or in other words, the needle is presumed to be at its origin point. From this position, the needle's location is restricted to be between zero and a fixed number of steps in the retracted direction from zero.

For the collision to occur without damage to the components, the needle preferably moves fairly slowly. In one embodiment, needle 140 moves at approximately 1.25 mm per second. Moving at this speed may result in a longer startup time (e.g. up to 4 seconds) than would be desired for many applications, such as in a passenger car, where engine startup has historically happened within approximately 2 seconds of turning the key in the ignition.

Figure 4:
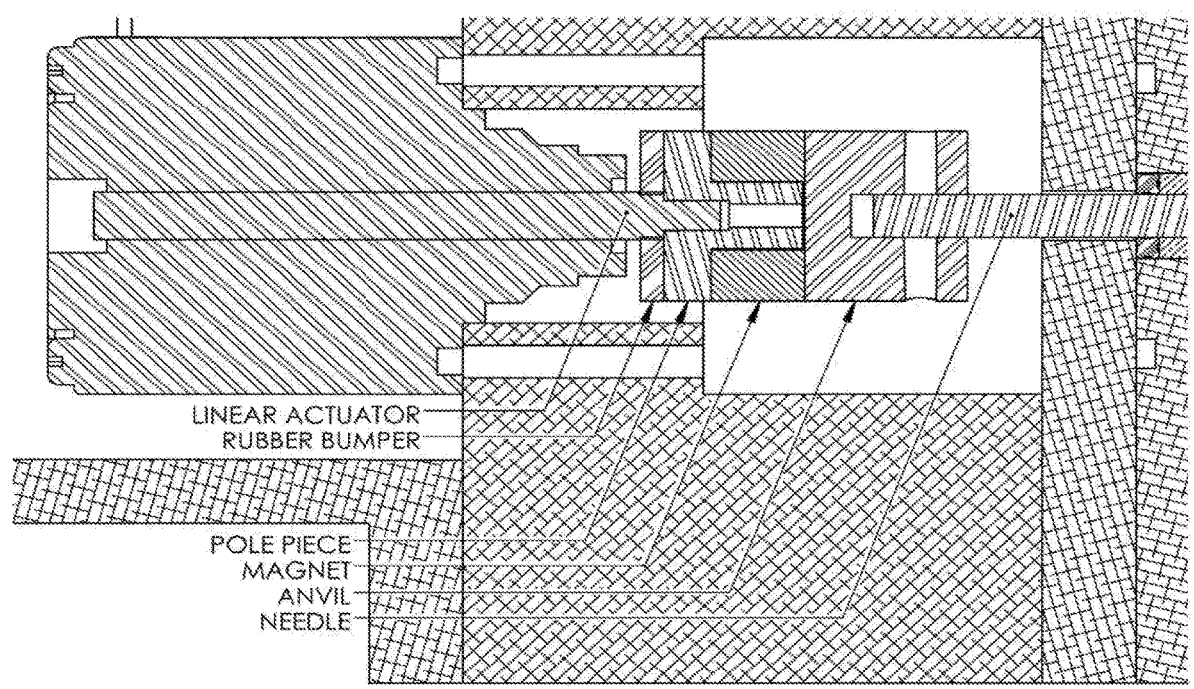
FIG. 4 is a diagram illustrating an ejector assembly showing the arrangement of the elastic element (rubber bumper), magnet, and anvil with respect to the linear actuator and needle.

To avoid damage resulting from such collisions, and enable faster operation of needle 140 and motor 190, ejector 100 may be constructed with an impact-absorbing element, as shown in FIG. 4. The impact-absorbing element may be an elastic element (such as a piece of rubber or a steel spring) coupled to a stop portion (or surface) of either 140 or motor 190, which would be contacted if needle 140 were moved as far away from primary nozzle opening 122 as possible. The impact-absorbing element may be directly or indirectly coupled to motor 190 (e.g., by coupling directly to primary nozzle 120). This impact-absorbing element, if properly selected, allows the stepper motor to collide with this stop without damage, even if moving at its maximum speed; this ensures safety even if many skipped steps accumulate in the direction of opening the primary nozzle. In an exemplary embodiment, the impact-absorbing element comprises a rubber bumper, as shown in FIG. 4. Impact absorbing elements may be positioned to contact a stop portion in both directions of movement of motor 190 (i.e., in both the insertion and retraction directions). For example, the rubber bumper shown and labeled in FIG. 4 operates as an impact absorbing element in the retraction direction, and another rubber bumper may be placed to act as an impact absorbing element in the insertion direction. Such a bumper may be placed between anvil 192 and the separator disposed between anvil 192 and primary inlet chamber 112.

Additionally, due to manufacturing tolerances of the stepper motor's leadscrew assembly, it is possible for the leadscrew to be substantially misaligned with the central axis of primary nozzle 120. In some cases, this misalignment between the axis of motor 190 and the axis of primary nozzle 120 may be as high as 0.025 inches.

In an exemplary embodiment, in order to address this problem without requiring manual alignment of the components following assembly of ejector 100, a magnetic coupling structure is employed to connect the end of needle 140 to the leadscrew of stepper motor 190, as shown in FIG. 4. This coupling structure comprises a ferrous structure (e.g. a steel anvil) attached to one of the needle 140 and the motor 190 and a permanent magnet attached to the other one of the needle 140 and the motor 190. The permanent magnet may include a ferrous (e.g. steel) backing to complete the magnetic circuit and provide stronger coupling of the permanent magnet to the ferrous structure.

In a preferred embodiment of ejector 100, as shown in FIG. 4, a steel anvil is attached to needle 140, and the leadscrew of stepper motor is attached to a steel pole piece with an annular or circular shaped permanent magnet bonded to it. This coupling pushes needle 140 into primary nozzle 120 by direct pressure (normal force) between axial surfaces of the anvil and the magnet. In the reverse direction, the force generated by the magnet is used to pull needle 140 out of primary nozzle 120, assisted by the pressure of the high-pressure supply gas on the tapered end of needle 140.

As shown in FIG. 4, the end of needle 140 opposite the tapered end extends to and is embedded in an opening in a ferrous structure (referred to in FIG. 4 as an anvil). The anvil is magnetically coupled to a permanent magnet such that axial force on the magnet is transmitted to the anvil and on to needle 140. The magnet may preferably be annularly shaped, as shown in FIG. 4, or may be a horseshoe or other type of multipole magnet. The permanent magnet is bounded in the center and on a rearward surface by a ferrous backing (referred to in FIG. 4 as a pole piece). The magnet and pole piece are further coupled to the leadscrew of motor 190, which operates as a linear actuator to move the needle in the axial direction. Depending on the construction of the stepper motor, the pole piece may be directly attached to the lead screw, which is prevented from rotating by a sliding coupling between the lead screw and the housing, while being translated axially by a threaded piece into which the leadscrew is engaged on the inside of the rotor. Alternatively, the pole piece may be attached to a threaded piece into which the rotating leadscrew is engaged, while the pole piece is prevented from rotating by a sliding coupling to the motor or other stationary part of the ejector. The pole piece has a rubber bumper mounted on the retraction side thereof to cushion impacts of the pole piece against motor 190 when needle is moved in the retraction direction.

This magnetic coupling structure transmits force effectively in both axial directions of needle 140 (i.e. the insertion and retraction directions), while also allowing components to slide with relative freedom in a radial direction of needle 140 (opposed only by friction between the ferrous structure and the magnet). To this end, the magnetic coupling structure is desirably free of any structures that would block radial movement of the components relative to one another. This permits large amounts of parallel (radial) misalignment between the leadscrew and needle to be accounted for without binding or wear.

In embodiments of ejector 100 in which the motor 190 is not coupled to an encoder, there exists the possibility that the stepper motor could "skip steps," or in other words, rotate at a different speed than the magnetic field due to mechanical forces or electrical power fluctuations, without the knowledge of the control unit. Since the pressure of the gas supply pushes needle 140 in the direction of primary nozzle opening 122, skipped steps are more likely to occur when needle 140 is being moved in the insertion direction, i.e., to close the primary nozzle opening 122 (and thus working against gas pressure). If these skipped steps were to accumulate over a given period of operation of ejector 100, the origin point as known by ejector control unit 240 would move away from the point at which the primary nozzle opening 122 is fully occluded, and ejector 100 would become unable to fully close, making it impossible to control output pressure at low flow rates.

To address this issue, ejector control unit 240 employs a "sliding zero" scheme in accordance with aspects of the present invention. In this scheme, when ejector control unit 240 is powered on, it assigns whatever position needle 140 is presently in as its origin point. Normally, the assumed origin point at startup will be at or close to the actual origin point (i.e. fully inserted position of needle 140 and fully occluded primary nozzle opening 122), because needle 140 will have been moved there by motor 190 during the previous powering down of the fuel cell system.

After needle 140 is assigned the presumed origin point, the output pressure of primary nozzle 120 is measured and compared to a predetermined output pressure (usually zero at startup). If the output pressure is higher than the predetermined pressure, this indicates that either the assigned origin point is not the point of full occlusion of primary nozzle opening 122, or gas demand is less than a seepage rate of gas through the fully occluded nozzle (due to wear or design tolerances of the needle and nozzle).

In the first situation, needle 140 is moved in the insertion direction toward primary nozzle opening 122 at a speed at which it can collide without damage. Following this movement, the origin point is reassigned to be equal to the new position of needle 140. In the second situation, attempting to move needle 140 with motor 190 results in needle 140 pressing against primary nozzle opening 122 and motor 190 will skip a step, so that needle 140 remains at the point of full occlusion and the origin point remains correct. Likewise, if gas pressure is below a desired level despite the needle having been driven to a maximum point determined by the ejector control unit 240, control unit 240 may control motor 190 to move needle 140 further away from the primary nozzle 120, and then the origin point may be reassigned so that its new position corresponds to actual position of maximum retraction.

As set forth above, the origin point at startup will normally be the actual origin point (the fully inserted position), because needle 140 will have been moved there during the previous shutdown of the fuel cell system. If needle position at startup is not at, or close to, fully occluded (due, for example, to an emergency power-off of the system), the sliding zero scheme described above will ensure that needle 140 is driven to full occlusion and the origin position is correctly reassigned. While a slow movement of needle 140 toward closing in this instance may lead to delivery of excessive gas, the gas supply can be shut off to prevent overpressure during this period. In the more likely scenario of proper shutdown, the accumulation of a small number of skipped steps in the closing direction will require only a very short period of time to fully close primary nozzle 120, and supply shutoff will likely not be necessary.

Figure 5:
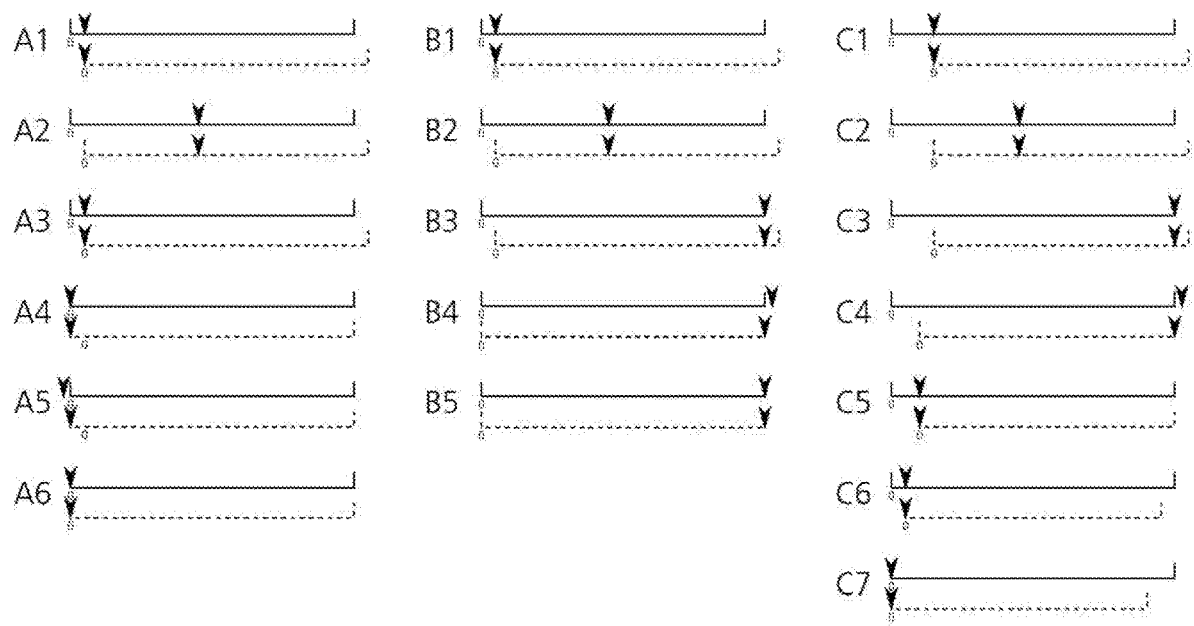
FIG. 5 is a chart illustrating a schematic for the sliding zero algorithm. The alignment of physical ranges (solid lines) and logical ranges (dashed lines) of movement is shown here.

The alignment of the physical and logical ranges of movement of needle 140 associated with the sliding zero scheme are illustrated FIG. 5. In FIG. 5, the physical range of movement of needle 140 is shown as a solid line, while the logical range assigned and monitored by ejector control unit 240 is shown as a dashed line.

In FIG. 5, column A, the ejector starts at its logical zero, but this is at a position slightly more open than the physical zero (A1). The needle can move back and forth as needed to regulate pressure (A2), but in order to completely shut off the flow of gas, the logical zero must realign with the physical. Once the needle has completed moving at full speed to the logical zero position (A3), if the output pressure is still too high, it will continue to move slowly in the closing direction, and the logical zero will be reset to refer to the needle's new position (A4). After this happens, if pressure is still too high the needle will continue moving slowly and collide with the primary nozzle (A5). This will cause no damage because of the low speed, but the linear actuator will skip a step and return to physical zero, maintaining alignment between physical and logical zeroes (A6).

In FIG. 5, column B, the ejector again starts at its logical zero but slightly open from physical zero (B1). The needle can move back and forth as needed to regulate pressure (B2), but if it attempts to open fully, the linear actuator will collide at full speed with the soft retraction stop while still at a logical position less than maximum (B3). The actuator will skip steps as it is driven toward the logical maximum (B4), causing the physical and logical zeroes to align (B5).

In some embodiments, the logical and physical ranges may not be the same size; this might be done to relax mechanical tolerances on the assembly. Column C in FIG. 5 illustrates this cases. If the needle begins sufficiently far from the physical zero (C1), it will move back and forth as needed (C2), and if requested to open fully, the actuator will collide with the soft stop (C3) and skip steps (C4), bringing the physical and logical zeroes closer to alignment (C5). The needle may also start as shown in C5, with the logical maximum equal to or less than the physical maximum. If requested to close from this position, the needle will do so slowly while remaining at logical zero (C6) until the logical and physical zeroes are aligned (C7).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A variable flow rate ejector comprising:
    a primary nozzle defining an opening, the primary nozzle connected to a first inlet chamber to receive a first fluid and transmit a flow of the first fluid through the primary nozzle opening;
    a needle disposed within the primary nozzle opening and having a tapered portion, the needle sized to create a gap between the tapered portion of the needle and the primary nozzle opening;
    a motor coupled to axially move the needle in order to vary a size of the gap between the tapered portion of the needle and the primary nozzle opening;
    a magnetic coupling structure attaching the needle to the motor, wherein the magnetic coupling structure lacks any structure blocking a radial movement of the needle;
    a first stop portion delimiting the axial movement of the needle by the motor in a direction of retraction of the needle from the primary nozzle opening; and
    a first impact-absorbing element coupled to the needle or to the stop portion, the first impact-absorbing element positioned to contact the first stop portion or the needle, respectively, when the needle is fully retracted from the primary nozzle opening by the motor.

2. The variable flow rate ejector of claim 1, wherein the motor comprises an electric stepper motor.

3. The variable flow rate ejector of claim 1, wherein the impact-absorbing element comprises a rubber bumper.

4. The variable flow rate ejector of claim 1, wherein the impact-absorbing element comprises a spring.

5. The variable flow rate ejector of claim 1, further comprising
    a second stop portion delimiting the axial movement of the needle by the motor in a direction of insertion of the needle into the primary nozzle opening; and
    a second impact-absorbing element coupled to the needle or to the second stop portion, the second impact-absorbing element positioned to contact the second stop portion or the needle, respectively, when the needle is fully inserted into the primary nozzle opening by the motor.

6. The variable flow rate ejector of claim 1, wherein the magnetic coupling structure comprises a ferrous structure coupled to one of the needle and the motor and a permanent magnet coupled to the other one of the needle and the motor.

7. The variable flow rate ejector of claim 6, wherein an axial surface of the ferrous structure contacts an axial surface of the permanent magnet.

8. The variable flow rate ejector of claim 1, wherein mating components of the magnetic coupling structure have a circular or annular shape.

9. The variable flow rate ejector of claim 1, further comprising:
    a secondary nozzle defining another opening downstream of the primary nozzle opening, the secondary nozzle connected to a second inlet chamber to receive a second fluid and transmit a flow of the second fluid and the flow of the first fluid through the secondary nozzle opening.

10. The variable flow rate ejector of claim 9, further comprising:
    a primary inlet opening into the first inlet chamber, the primary inlet configured to be connected to a first fluid source at a first pressure; and
    a secondary inlet opening into the second inlet chamber, the secondary inlet configured to be connected to a second fluid source at a second pressure lower than the first pressure,
    wherein the second inlet chamber is disposed such that when the second fluid source is connected to the secondary inlet at the second pressure, at least a portion of the second fluid is entrained in the flow of the first fluid through the primary nozzle, thereby creating the flow of the first and second fluids.

11. The variable flow rate ejector of claim 9, wherein a distance from an outermost edge of the primary nozzle opening to an innermost edge of the secondary nozzle opening is less than a diameter of the secondary nozzle opening.

12. The variable flow rate ejector of claim 9, wherein the secondary nozzle opening has a diameter from one to five times a diameter of the primary nozzle opening.

13. The variable flow rate ejector of claim 9, further comprising:
    a tapered portion positioned downstream of the secondary nozzle opening, the tapered portion widening in the direction of the flow of the first and second fluids.

14. The variable flow rate ejector of claim 13, further comprising:
a constant-width throat portion extending between the secondary nozzle opening and the tapered portion.

15. The variable flow rate ejector of claim 14, wherein the throat portion has a length of at least six times a diameter of the throat portion.

16. The variable flow rate ejector of claim 9, further comprising:
a pressure sensor disposed downstream of the secondary nozzle;
an ejector control unit in communication with the pressure sensor and the motor, the ejector control unit configured to control the motor to axially move the needle to maintain fluid flow from the ejector at a predetermined pressure based on pressure sensed by the pressure sensor.

17. A method for recirculating hydrogen gas inside a fuel cell system including the variable flow rate ejector of claim 9, the method comprising the steps of:
supplying a first quantity of hydrogen gas to the first inlet chamber at a first pressure;
supplying a second quantity of hydrogen gas to the second inlet chamber at a second pressure lower than the first pressure; and
controlling the flow of the hydrogen gases from the ejector by axially moving the needle using the motor.

18. The method of claim 17, further comprising the step of:
sensing a pressure of the flow of the hydrogen gases from the ejector,
wherein the controlling step comprises controlling the flow of the hydrogen gases from the ejector by axially moving the needle based on the sensed pressure of the flow of the hydrogen gases.

19. A method for operating a variable flow rate ejector, the ejector comprising a primary nozzle defining an opening, a needle disposed within the primary nozzle opening, and a stepper motor coupled to axially move the needle, the method comprising the steps of:
assigning a first position of the needle to be an origin position of the needle with an ejector control unit;
measuring an output pressure of the ejector, the output pressure comprising a pressure of fluid flowing past the needle through the primary nozzle opening;
comparing the output pressure to a predetermined pressure;
when the output pressure exceeds the predetermined pressure, controlling the motor with the ejector control unit to axially move the needle one or more steps in an insertion direction of the needle relative to the primary nozzle opening until the needle reaches a fully inserted position;
assigning the fully inserted position of the needle to be an updated origin position of the needle with the ejector control unit; and
controlling the motor with the ejector control unit to axially move the needle a number of steps relative to the updated origin position.

20. The method of claim 19, further comprising the step of:
controlling the motor with the ejector control unit to axially move the needle an additional step in the insertion direction of the needle after the needle reaches the fully inserted position, such that the motor skips the additional step.

21. The method of claim 19, wherein further comprising:
powering on the ejector control unit,
wherein the step of assigning the first position of the needle to be the origin position occurs immediately following the step of powering on the ejector control unit.

22. The method of claim 19, wherein the first position of the needle is the same as the fully inserted position of the needle.

23. The method of claim 19, further comprising:
powering down the ejector control unit; and
controlling the motor to axially move the needle to the origin position during the step of powering down the ejector control unit.

24. The method of claim 19, wherein the fully inserted position of the ejector comprises a position at which a tapered portion of the needle contacts the primary nozzle opening.

25. The method of claim 24, wherein the contact between the tapered portion of the needle and the primary nozzle opening fully occludes the primary nozzle opening.

26. The method of claim 19, wherein the ejector control unit controls the motor to move the needle at a speed below a predetermined speed, the predetermined speed determined to be a speed below which no damage occurs when the needle contacts the primary nozzle opening.

27. The method of claim 19, further comprising the steps of:
assigning a maximum position of the needle with the ejector control unit based on the origin position of the needle;
controlling the motor with the ejector control unit to axially move the needle one or more steps in a retraction direction of the needle relative to the primary nozzle opening until the needle reaches a fully retracted position; and
assigning the fully retracted position of the needle to be the maximum position of the needle with the ejector control unit.

28. The method of claim 27, further comprising the step of:
controlling the motor with the ejector control unit to axially move the needle an additional step in the retraction direction of the needle after the needle reaches the fully retracted position, such that the motor skips the additional step.

* * * * *